April 13, 1926.
H. H. HUMMEL
PRESS CONSTRUCTION
Filed Jan. 18, 1923  5 Sheets-Sheet 1
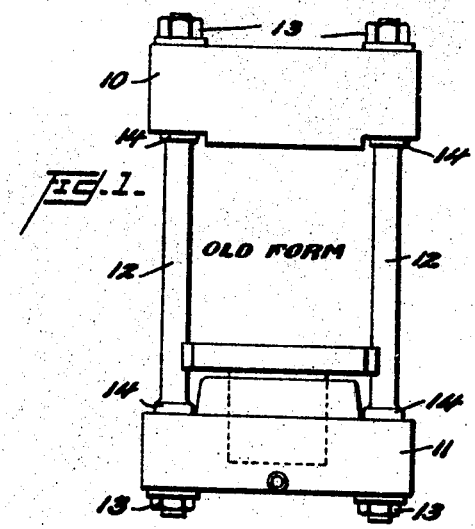
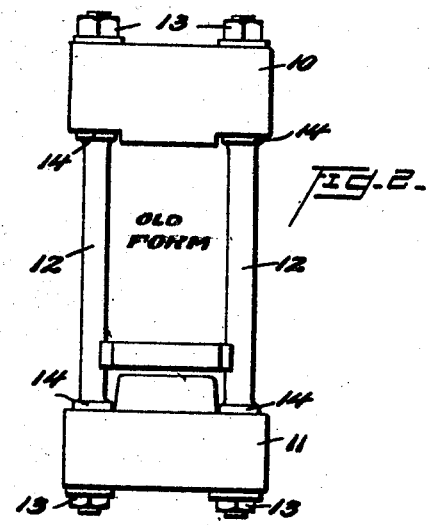
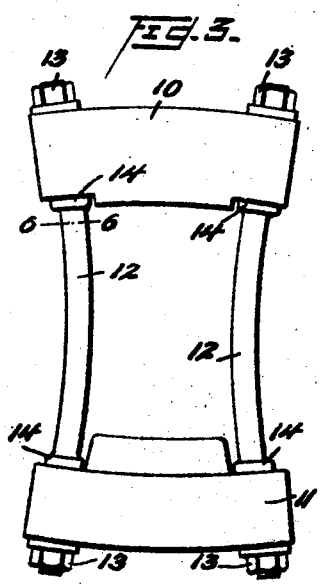
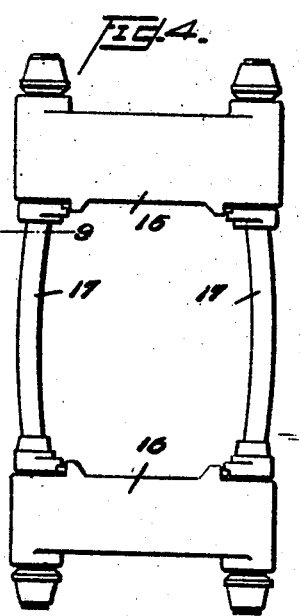
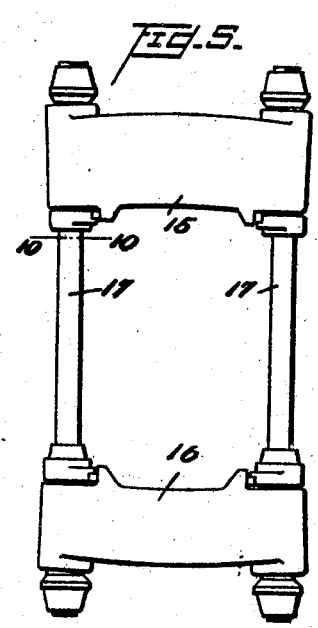
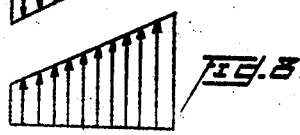
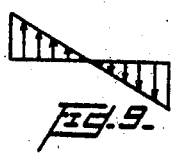

April 13, 1926.
H. H. HUMMEL
1,580,894
PRESS CONSTRUCTION
Filed Jan. 18, 1923   5 Sheets-Sheet 2
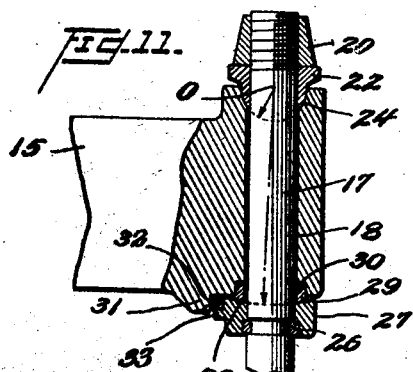
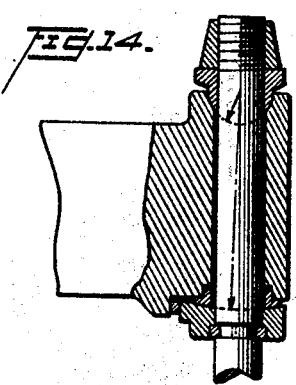
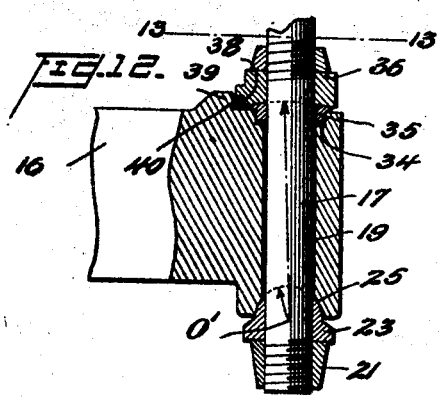
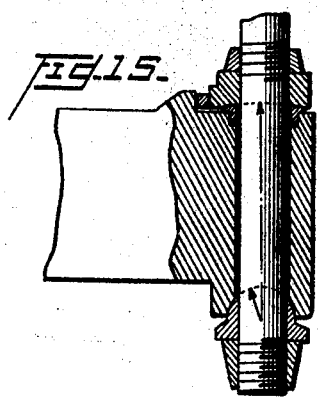
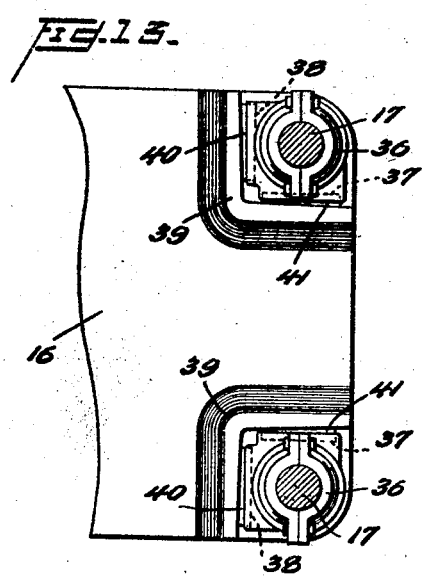
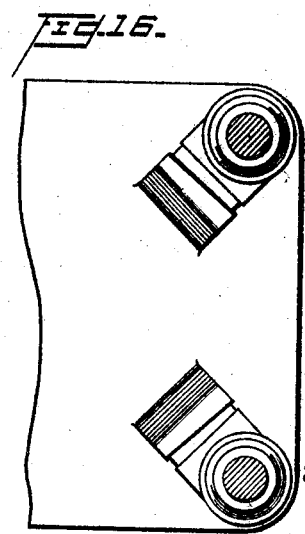
Inventor
H. H. Hummel,
By Watson, Coit, Morse & Grindle
Attorney

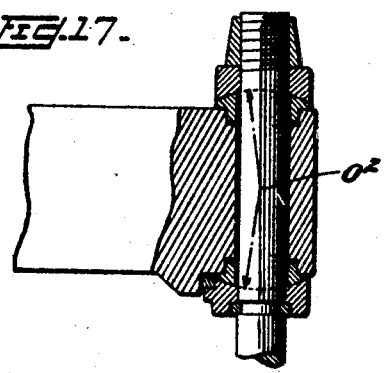
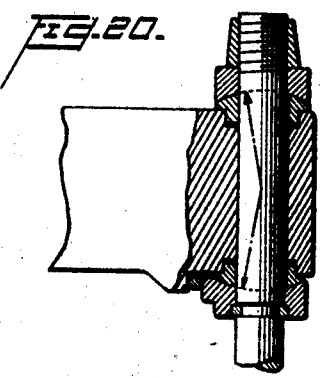
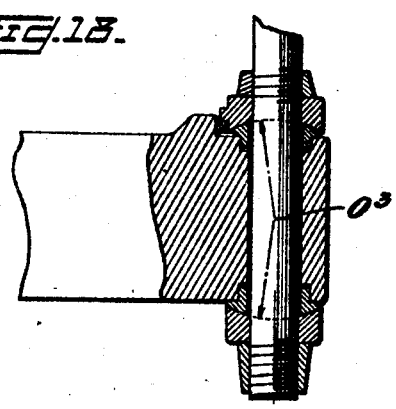
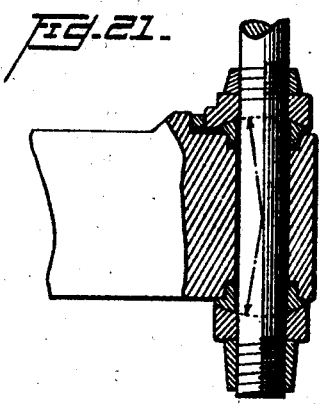
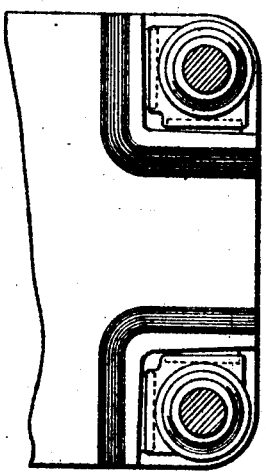
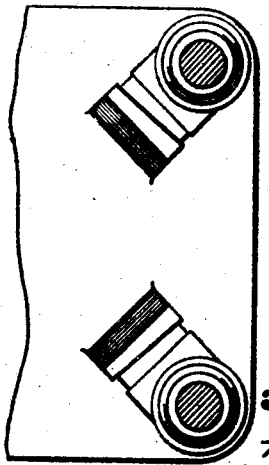

April 13, 1926.
H. H. HUMMEL
1,580,894
PRESS CONSTRUCTION
Filed Jan. 18, 1923    5 Sheets-Sheet 4
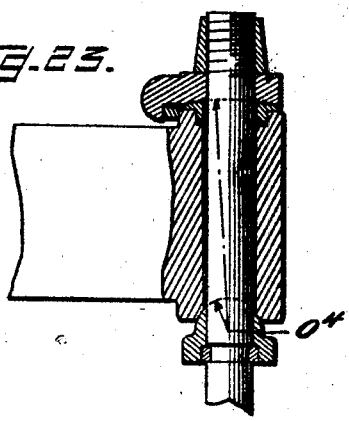
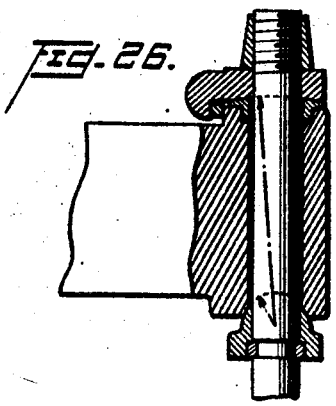
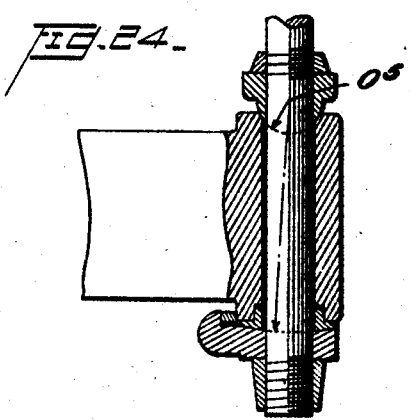
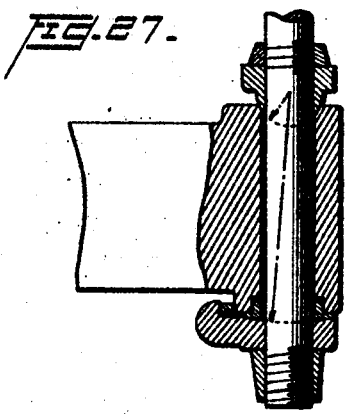
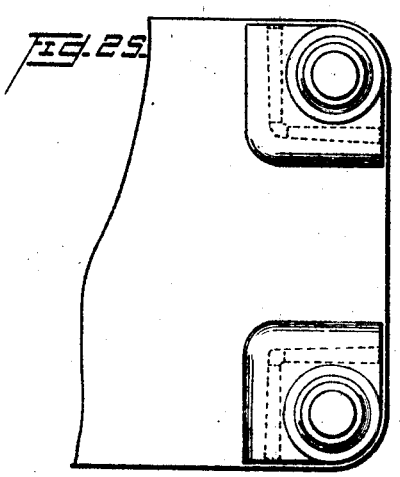
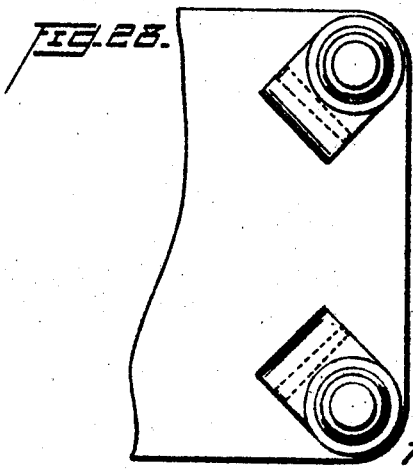
Inventor
H. H. Hummel April 13, 1926.

H. H. HUMMEL

PRESS CONSTRUCTION

Filed Jan. 18, 1923

Inventor
H. H. Hummel,

By Watson, Coit, Morse & Grindle,
Attorney

Patented Apr. 13, 1926.

1,580,894

UNITED STATES PATENT OFFICE.

HOWARD H. HUMMEL, OF BETHLEHEM, PENNSYLVANIA, ASSIGNOR TO BETHLEHEM STEEL COMPANY, A CORPORATION OF PENNSYLVANIA.

PRESS CONSTRUCTION.

Application filed January 18, 1923. Serial No. 613,538.

*To all whom it may concern:*

Be it known that I, HOWARD H. HUMMEL, a citizen of the United States, and residing at Bethlehem, Lehigh County, State of Pennsylvania, have invented certain new and useful Improvements in Press Constructions, of which the following is a specification.

The present invention relates to press constructions and particularly to the platen and connecting column construction of heavy duty presses.

In hydraulic extrusion presses and other heavy duty presses now commonly utilized in the mechanical arts it is found, where the platens used are relatively long, that the supporting columns frequently fail by fracture at or near the platens. When the press is heavily loaded, the platens are distorted, though without exceeding the elastic limit of the metal utilized, and as a result of the bending of the platens the connecting columns are likewise distorted, these columns being rigidly secured to the platens. Thus, in the ordinary case where the parallel platens are rectangular and have their corners rigidly connected by columns, heavy pressures against the platens result in their being bowed outwardly so that the pairs of connecting columns, which are rigidly secured to the platens are necessarily bowed inwardly. As a result the fibers on the inner sides of the columns are subjected not only to the heavy tensional stresses due to the loading but also to additional tensional stresses of considerable magnitude due to the bending of the columns. The unit stresses due to the bending of the columns when added to the unit stresses due to the load imposed on the press may produce total unit stresses in the inside portions of the columns which are near or above the elastic limit of the metal of which the columns are fabricated so that repeated loadings of the press and repeated deflections of the columns eventually causes the formation of transverse cracks therein, generally at the points of maximum deflection, which cracks spread until failure of the columns finally results.

The object of the present invention is to provide a press construction in which the unit stress in any column never at any time exceeds the unit stress which results from the load imposed on the press. The construction is such that the stress over the cross sectional area of each column when the press is loaded, is uniform, this stress resulting from loading alone, and no portion of the column is subjected to a stress which approaches the elastic limit of the material. Repeated loadings therefore have no tendency to cause fracture of the columns even when a considerable distortion of the platens occurs under heavy loads.

In certain classes of work, as for instance, when dies are being operated by the press, a considerable force may be exerted which will tend to move the platens laterally relatively to each other, that is, forces are exerted which are not parallel to the columns. Where the columns are rigidly secured to the platens, as for instance by collars mounted on the columns between which the platens are rigidly clamped, such lateral movements cause wearing away of the contacting surfaces of the platen and clamping collars. Ultimately the contacting surfaces of the platens and columns become so worn that the upper platen will have a limited movement relatively to the lower platen, that is, it may sway or wabble. This wabbling of the press is very objectionable and can only be eliminated by dismantling the press and machining the abutment faces of the platens and clamping collar to true the bearing surfaces.

It is a second object of the invention, therefore, to provide a press in which the possibility of this wearing is eliminated so that no wabbling of the press may take place, even after long continued use.

In accordance with my invention the columns are pivoted or hinged to the platens. The invention may be embodied in various forms, a number of which are illustrated in the accompanying drawings. Each modification is constructed in accordance with the spirit of the invention, the connection between the platens and columns being such that the platen may be deflected under load without imparting bending strains to the columns and in such manner that wabble or looseness does not result where the loads are not exactly parallel to the columns.

In the drawings:

Figs. 1 and 2 illustrate in front and side elevation respectively a simple press of known construction;

Fig. 3 shows this press under load, the deflection of the platens and columns being greatly exaggerated;

Fig. 4 shows diagrammatically my improved press in front elevation, the press being unloaded;

Fig. 5 shows my improved press loaded;

Figs. 6, 7 and 8 are stress diagrams respectively illustrating graphically the stresses in column section 6—6 of the press shown in Fig. 3, due to the load imposed on the press (Fig. 6), to the deflection of the column under load (Fig. 7), and to the summation of the loading and bending stresses (Fig. 8);

Fig. 9 is a force diagram at the position indicated by the line 9—9 of Fig. 4 and showing the stress in a column of my improved press when not under load;

Fig. 10 is a similar diagram at the position indicated by the line 10—10 of Fig. 5 and showing the stress over a section of a column when under load;

Fig. 11 is a view of one corner of the upper platen, partially broken away, showing one form of hinged or swivel connection between the column and platen;

Fig. 12 is a similar view of the lower platen showing the manner in which the lower end of the column is connected to the platen;

Fig. 13 is a section on line 13—13 of Fig. 12;

Figs. 14, 15 and 16 are similar respectively to Figs. 11, 12 and 13 but illustrating modified hinged connections between the platens and columns;

Figure 29:
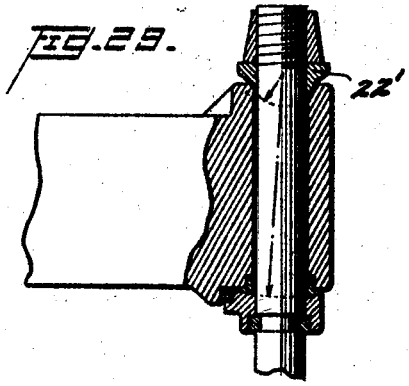
Figure 32:
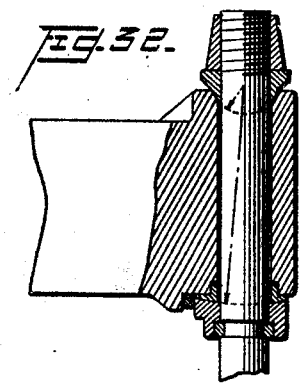
Figure 30:
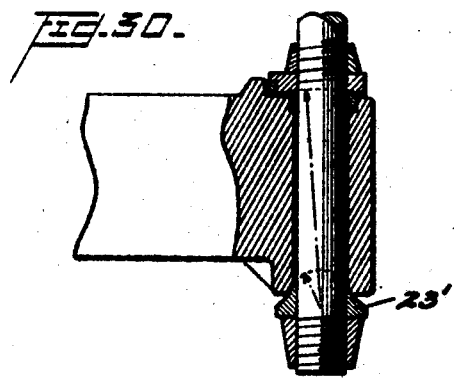
Figure 33:
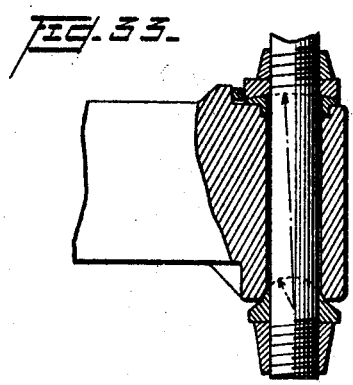
Figure 31:
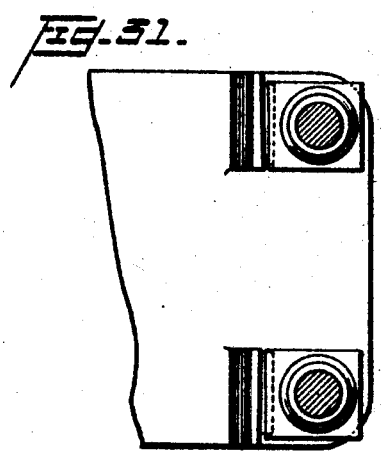
Figure 34:
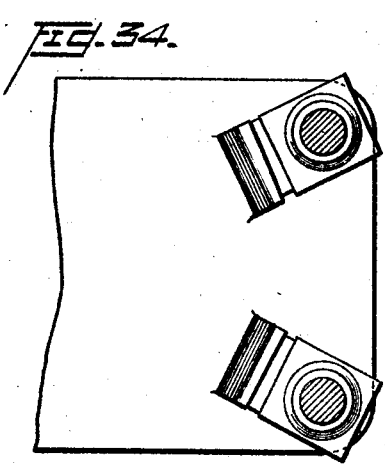

Figs. 17 to 34 inclusive illustrate further modifications, indicating the variety of embodiments the invention may have, each embodiment having three views arranged in a group as in the case of the form illustrated in Figs. 11, 12 and 13.

The invention may be incorporated in presses of widely different types and is not limited to use with a press of a particular design, but it will be understood that it is particularly useful when applied to heavy duty presses, such as drawing and forming presses.

In Figs. 1, 2 and 3 a simple press is illustrated which is a well-known type and which is illustrated and herein described so that the present invention may be clearly understood.

The platens 10 and 11 of this press are connected by columns 12 which extend through openings in the corners of the platens. The platens are rigidly secured to the columns by means of the nuts 13 and clamping collars 14, the nuts being threaded on the ends of the columns 12 and tightly turned so that the platens are clamped between the nuts 13 (or interposed washers) and clamping collars 14. In Fig. 3 this press is shown under load, the deflection of the columns and platens being greatly exaggerated. Due to the heavy load imposed, the platens will be bowed outwardly and, owing to the rigid connection between the platens and columns the latter will be bowed inwardly as shown. Analyzing the forces at the point of maximum deflection (section 6—6), it will be seen that the inner fibres are stressed due to the loading, which stress is uniform over the cross section, as shown in Fig. 6, and subject to the additional stress due to bending, as shown in Fig. 7, both stresses being tensional. The resultant stresses over the entire cross section are shown in Fig. 8 and it can be seen that while the tension in the outer fibres is relatively small, due to the subtraction of the compressive bending stresses, the tensional stress in the inner fibres is relatively great. Repeated loadings of the press eventually cause the columns to fail along the section 6—6, the innermost and most greatly stressed fibres failing first and the crack gradually spreading from the inside of the column to the outside.

In Figs. 4 and 5 my improved press is illustrated diagrammatically, when unloaded and loaded. It will be seen that the press when unloaded (Fig. 4) has its columns bowed outwardly and that when the press is loaded (Fig. 5) the columns are straight, or approximately so, even when the platens are deflected. By means of the novel connecting means hereinafter to be fully described the columns are bowed outwardly when the press is unloaded so that the section at the point of deflection (9—9) is under some initial bending stress, as shown diagrammatically in Fig. 9. It will be understood that the columns of the press are not fabricated in a curved condition but are formed straight and are forced into a curved shape after assembly with the platens by means hereinafter to be described. When the press illustrated in Fig. 4 is loaded, the platens 15 and 16 will tend to deflect as shown in Fig. 5 and the columns 17 will tend to become straight. As the columns straighten, the stresses over the mid sections due to the enforced curvature gradually becomes zero and when the press is fully loaded each cross section of each column will be uniformly stressed, as illustrated diagrammatically in Fig. 10. There is no danger, therefore, that the columns be overstrained, the maximum stress being that resulting from the loading of the press alone. The columns are circular in cross section, since this is the most satisfactory construction, but they may have other cross sectional shapes if desired.

The preferred form of connection between the columns and platens is illustrated in Figs. 11, 12 and 13. The column 17 extends through aligned cylindrical apertures 18 and 19 in the platens 15 and 16 respectively and is threaded at its ends to receive nuts 20 and 21. Nuts 20 and 21 bear respectively on washers 22 and 23 which encircle shaft 17 and which are provided with spherical bearing surfaces to engage spherical recesses 24 and 25 formed in the upper surface of the upper platen and the lower surface of the lower platen respectively. The centers of curvature of these spherical surfaces are indicated at O and O' respectively and these are the centers about which the column 17 may flex, there being sufficient clearance between the column and the walls of the cylindrical openings 18 and 19 respectively to permit such flexure. The upper platen is supported from the shaft by means of a split ring 26 which lies in an annular groove in the shaft and which supports a collar 27 having a spherical bearing surface 28 which in turn contacts with a correspondingly formed bearing surface on a washer 29 seated in a countersunk recess 30 in the lower face of the platen. The mutually abutting spherical surfaces of collar 27 and washer 29 have the point O as a common center and it will be seen that when the shaft flexes about point O, the members 27 and 29 will have a relative sliding movement, but that the collar 27 serves to support the platen 15 at all times.

A buttress or flange integral with the platen is shown at 31 and a key is illustrated at 32. The buttress has a flat face which extends at right angles to the side of the platen and the collar 27 has a flat bearing surface 33 substantially parallel to the face of the buttress. There is a second buttress (not illustrated) at right angles to buttress 31 and in rear of the column and a second key to cooperate with the same and with the collar 27, the function of which will be described in connection with the lower platen construction.

Encircling the shaft with ample clearance to permit flexure thereof and seated in an annular recess 34 in the upper surface of the bottom platen is a ring 35 having a spherical surface centered at O'. Above this and also encircling the shaft is a sleeve like member or collar 36 having a lower spherical bearing surface also centered at O' and resting upon the upper surface of ring 35. Collar 36 is provided with two flat faces 37 and 38 (Fig. 13) which lie substantially parallel to the flat faces of a flange or buttress 39 formed on the upper surface of the lower platen 16 (which buttress is similar to that formed on the upper platen). Keys 40 and 41 are adapted to be driven between the flat faces of the sleeve and buttress.

In assembling, the parts are first positioned as illustrated in Figs. 11, 12 and 13 except that the keys are not placed in position. The press is then put under a heavy load so that the platens are distorted. Due to the ball and socket connection between the columns and platens, however, no deflection of the columns will occur and it follows that the flat faces of the buttress 31 and 39 (particularly those extending transversely of the platens) will pull away slightly from the collars 27 and 36. The wedges are then driven in while the press is loaded and when the press is unloaded the platens in assuming their normal conditions and acting through the buttresses, keys, and collars exert considerable outwardly directed forces on the columns which cause them to bow slightly outwardly around points O and O'.

The columns are therefore outwardly distorted as shown in Fig. 4, and when the press is subsequently loaded to the same degree the columns will become straight.

In Figs. 14, 15 and 16 a modified construction is illustrated which is similar to that illustrated in Figs. 11, 12 and 13 with the exception that but a single buttress and key is used with each column, these buttresses being substantially at right angles to lines connecting opposite corners of the platens, that is, to diagonals of the platens. In the form of the invention illustrated in Figs. 17, 18 and 19 the spherical surfaces of the collars encircling the shaft are described about points $O^2$ and $O^3$ respectively, in the neutral planes of the respective platens. Two keys are utilized, as in the form shown in Figs. 11, 12 and 13.

The modification illustrated in Figs. 20, 21 and 22 is similar to that illustrated in Figs. 17, 18 and 19 with the exception that a single buttress and key is used for each column, the buttress and keys being arranged at right angles to diagonals of the platens.

In Figs. 23, 24 and 25 a form of the invention is illustrated in which the spherical bearing surfaces of the respective parts are shown to be described about points $O^4$ and $O^5$ which lie respectively below the upper platen and above the lower platen. Details are modified somewhat but the principle of ball and socket connection remains the same.

That form of the invention shown in Figs. 26, 27 and 28 is similar to the modification just described with the exception that a single buttress and key is used with each column instead of two keys and two buttresses.

In Figs. 29 to 34, inclusive, I show a further modified form of my invention in which, instead of the bearing surfaces being spherical as in the preceding views, such surfaces are cylindrical and taken about centers arranged at the outsides of the upper and lower platens, as indicated in Figs. 11 and 12. It will be obvious that the curvature of these elements might be arranged about centers falling in the neutral planes of the platens, as indicated in Fig. 17, or such centers might be taken at the insides of the upper and lower platens, as indicated in Figs. 23 and 24. The cylindrical type of bearing may be used in situations where the platens are deflected largely in one direction, the keys being inserted after deflection in order that the columns may be placed under initial stress as heretofore indicated.

From the foregoing, it will be apparent that I have devised various ways whereby the columns of the press may be placed in an initial condition of stress which will neutralize effects that would otherwise result from bending of the columns in consequence of deflection of the platens.

While I have shown several forms of joints between platens and columns which permit of the columns being placed in an initial state of stress after restitution of the platens from a condition of deflection, it will be obvious to those skilled in the art that various other types of joints coming within the scope of the appended claims may be used.

Having thus described the invention what is claimed as new and desired to be secured by Letters Patent is:

1. The combination with the upper platen of a press, of a plurality of columns, and means for securing the platen in position upon the columns, said means including two members mounted on the column and having concentric spherical bearing surfaces, said platen having two concentric bearing surfaces cooperating therewith.

2. The combination with the platen of a press, of a plurality of columns and means for securing the platen in position upon the columns, said means including two members mounted on each column, one above the platen and one below the platen, each of said members having a curved surface bearing against the platen.

3. A press construction comprising a platen, a supporting column at an angle to the platen and means for securing the platen on the column against longitudinal movement thereon which means permits a limited relative angular movement therebetween.

4. A press construction comprising a platen, a supporting column at an angle to the platen and means including two collars encircling the shaft, one on each side of the platen for securing the platen on the column against longitudinal movement thereon, which means permits a limited relative angular movement therebetween.

5. A press construction comprising a platen, a supporting column at an angle to the platen and means for securing the platen on the column against longitudinal movement thereon which means permits a limited relative angular movement therebetween about a point on the axis of the column and adjacent the platen.

6. The combination with a platen of a press, of a plurality of columns and means for securing the platen in position upon the columns, said means including two members mounted on each column, one above the platen and one below the platen, each of said members having a curved surface bearing against the platen, said curved surfaces having a common center.

7. The combination with a platen of a press, of a plurality of columns and means for securing the platen in position upon the columns, said means including two members mounted on each column, one above the platen and one below the platen, each of said members having a curved surface bearing against the platen, said curved surfaces having a common center on the axis of the column.

8. In a press, in combination, spaced parallel platens adapted to bend slightly under load, columns also adapted to flex, and connections between the platens and columns whereby the columns are flexed outwardly when the press is unloaded and the platens undistorted and allowed to straighten when the platens flex under load.

9. A press including spaced platens and columns connecting the same, the columns being flexed when the press is unloaded and being straightened when the press is loaded.

10. In a press, the combination of a platen, supporting columns for the platen, spherically-surfaced bearing elements between the columns and the platen, whereby, upon initial deflection of the platen under load, the columns may move angularly with respect to the platen, and means insertable between the platen and the column and effective to preserve the angular position of the columns with respect to the platen, whereby, when the load is removed, the columns will be deflected outwardly.

11. In a press, the combination of upper and lower platens having openings for connecting columns, connecting columns passing through the openings, spherically-surfaced bearing elements between the columns and the platens and located at opposite ends of the openings, whereby when the platens are initially deflected under load the columns may move angularly with respect thereto, and spacing means insertable between the columns and the platens when the press is initially loaded in order that predetermined angular positions of the columns with respect to the platens may be preserved and the columns bent outwardly to the extent determined by the spacing means when the press is unloaded.

In testimony whereof I hereunto affix my signature.

HOWARD H. HUMMEL.